United States Patent Office 2,905,663
Patented Sept. 22, 1959

2,905,663

HYDROCARBON HYDROCRACKING PROCESS WITH A BORON CHLORIDE AND ALUMINUM METAL CATALYST

Louis Schmerling, Riverside, Ill., assignor, by mesne assignments, to Universal Oil Products Company, Des Plaines, Ill., a corporation of Delaware No Drawing. Application March 18, 1954
Serial No. 417,225

2 Claims. (Cl. 208—108)

This invention relates to a process and catalyst for converting hydrocarbonaceous material and particularly to a process for hydrocracking a petroleum fraction or similar substance and a catalyst therefor.

In one embodiment this invention relates to a catalyst containing boron chloride and aluminum.

In another embodiment this invention relates to a process for converting a hydrocarbonaceous material which comprises contacting the material to be converted at conversion conditions with a catalyst containing boron chloride and aluminum.

In a specific embodiment the present invention relates to a process for hydrocracking a hydrocarbon fraction by contacting said fraction at a temperature of from about 700° F. to about 1200° F. and at a pressure of from about 100 p.s.i. to about 10,000 p.s.i. or more in the presence of hydrogen with a catalyst comprising boron chloride and aluminum.

Although the process and catalyst of the present invention may be applied to the conversion of many materials including gasoline, kerosene, gas oil, powdered coal, shale, tar sands, etc., it is particularly useful in processing residuum fractions such as topped crude, reduced crude, cracked residuum, etc. The problem of converting residuum is particularly acute since the demand for the lighter petroleum fractions has increased while crude, as it comes from the well, has been increasingly carbonaceous and lacking in light material.

Thermal cracking processes and catalytic cracking processes using solid siliceous type catalyst are not well adapted for use with residuum fractions since the coke forming tendencies of residuum fractions preclude long active life of such a catalyst. Similarly, the coke forming tendencies of a residuum fraction reduces the time that a thermal cracking unit may remain on stream so that economical operation is difficult. Furthermore, thermal treatment of a residuum fraction results in excessive loss in yield because of the non-selective nature of the destructive reactions which cause large amounts of normally gaseous material and coke to be formed.

The present invention provides a means for converting a highly carbonaceous material and reducing the average molecular weight of the material by a process that does not form excessive quantities of gas or coke. As will be shown, by practicing the present invention, unexpectedly high yields of gasoline may be obtained with relatively little formation of coke or normally gaseous material.

Following are two examples which illustrate the exceptional catalytic properties of the catalyst of this invention and other examples that illustrate that the catalyst in this invention is unique both in its catalytic activity and the selectivity of the reactions. The catalytic activity of the mixed catalyst of the present invention is particularly surprising in light of the fact that boron chloride is not a Friedel-Crafts catalyst.

Example I 200 grams of topped crude were placed in a glass lined rotating autoclave with 10 grams of boron chloride and 5 grams of aluminum metal under a hydrogen pressure of 100 atmospheres. The contents of the bomb were agitated and heated to a temperature of 750° F. for a period of 4 hours after which the bomb and its contents were cooled. The contents of the bomb were discharged and an examination showed a weight percent liquid yield of 76% of which 65% boiled in the gasoline range. This amounts to a 49.4% conversion of the original stock to gasoline.

Example II 200 grams of topped crude were placed in a glass lined rotating autoclave with 8 grams of boron chloide and 2 grams of aluminum metal granules under a hydrogen pressure of 100 atmospheres. The contents of the bomb were agitated and heated to a temperature of 750° F. for a period of 4 hours after which the bomb and its contents were cooled. The contents of the bomb were discharged and an examination showed an 86.5 weight percent yield of which 42% boiled in the gasoline range. This amounts to a 35.2% yield of gasoline based on the original charge to the autoclave.

Example III

To illustrate that the catalytic activity of the present catalyst is due to a peculiar association between boron chloride and aluminum and not due simply to furnishing chloride ions to the mixture to form aluminum chloride, an experiment was conducted in which chloride ions in the form of hydrogen chloride and aluminum metal were used as a catalyst.

200 grams of topped crude were placed in a glass lined rotating autoclave with 8 grams of hydrogen chloride and 2 grams of aluminum metal granules, which quantities are identical to those of catalyst used in the foregoing Example II. The mixture was placed in a rotating autoclave under a hydrogen pressure of 100 atmospheres and the contents of the bomb were agitated and heated to a temperature of 750° F. for a period of 4 hours after which the bomb and its contents were cooled. The contents of the bomb were discharged and an examination showed an 86.5 weight percent yield of which 2% boiled in the gasoline range which amounts to 1.73% conversion to gasoline based on the original charge to the autoclave. It may readily be seen that nascent aluminum chloride produced in situ by the presence of aluminum metal and chloride ions is not the catalyst of the present invention.

Example IV

In order to determine whether or not boron chloride in itself is the catalyst of the present invention the following experiment was conducted.

200 grams of topped crude were placed in a glass lined rotating autoclave with 23 grams of boron chloride under a hydrogen pressure of 100 atmospheres. The contents were agitated and heated to a temperature of 750° F. for a period of 4 hours after which the bomb and its contents were cooled. The contents of the bomb were discharged and an examination showed a 91.5 weight percent yield of which none boiled in the gasoline range. It may be seen from this example that boron chloride in itself is not a hydrocarbon conversion catalyst with respect to hydrocracking.

Example V

The process of the present invention was conducted under a nitrogen atmosphere in order to determine whether or not the presence of hydrogen was necessary for it to function.

In this experiment 200 grams of topped crude were placed in a glass lined rotating autoclave with 10 grams of boron chloride and 5 grams of aluminum metal granules under a nitrogen pressure of 100 atmospheres. The contents of the bomb were agitated and heated to a temperature of 750° F. for a period of 4 hours after which the bomb and its contents were cooled. The contents of the bomb were discharged and an examination showed a 100 weight percent yield containing no material boiling in the gasoline range. For all practical purposes the product from the foregoing process was virtually identical to the charge stock, no conversion being effected.

From the foregoing examples it may readily be seen that a catalyst consisting of boron chloride and aluminum metal has desirable properties of selectivity and high activity. The specific catalyst of the present invention gives yields of gasoline in the range of 50% and consequently relatively small yields of coke and normally gaseous materials. Even the material in the product that is not gasoline has a lower average molecular weight and consists of useful light distillates such as kerosene, gas oil, fuel oil, etc. which is saturated in nature as opposed to the product from conventional catalytic cracking processes. Although the exact mechanism of the reaction using the present catalyst is not known, it appears that the catalyst substance may be an intermediate compound resulting from an interaction between the bimetal couple consisting of boron and aluminum. As indicated by the examples neither boron chloride nor aluminum chloride by itself shows the catalytic activity of the catalyst of this invention.

It is of course understood that in the illustrations in the examples, the process was effected at a temperature of 750° F. and 100 atmospheres of initial hydrogen pressure for the sake of comparing results at identical operating conditions. The examples are not intended to limit the present process to the operating conditions which were selected for the sake of convenience but are intended as mere illustrations of the advantages and utility of the present process. As hereinbefore stated the process may be effected at temperatures of from about 650° F. to about 1200° F. or more depending upon the degree of reaction that is desired and the characteristics of the charge stock. It is desired to operate at high temperatures when a more refractory charge stock such as a residuum fraction containing a high proportion of recycle stock is to be processed. It will also often be desirable to operate at high temperature when a lower boiling charge stock such as kerosene or naphtha is to be processed in that the smaller molecules in a low boiling fraction are more resistant to destructive reactions.

Inasmuch as the reaction effected by the present process is a combination of cracking and hydrogenation, it will be desirable to operate at as high a pressure as is practical since high pressure favors hydrogenation reactions both with respect to equilibrium and rate. It is contemplated that pressures ranging from 100 to 10,000 p.s.i. or more may be used depending upon the product desired and the characteristics of the charging stock. When a highly unsaturated charge stock is used it will be desirable to operate at a higher pressure to diminish the amount of coke formation due to polymerization of unsaturated material. In most cases the limitation of hydrogen pressure in the reaction zone will be based on economical considerations in the construction of equipment to withstand high pressures.

Ordinarily the hydrogen will be recirculated through the system and passed into the reaction zone concurrently with the charge stock. The hydrogen will preferably be in a mole ratio of from about 1 to about 20 moles of hydrogen per mole of hydrocarbon charge. The hydrogen need not be pure and it may contain up to 50% contaminants such as hydrocarbon gases or oxides of carbon. The gas may be recycled within the process or it may be obtained from other refinery sources as from the net gas made from a reforming process or it may comprise a combination of both.

Ordinarily the pressure will be regulated to be consistant with economical plant design as well as with the most favorable operating and equilibrium conditions. When a saturated product is not desired the process may be operated at only a slight superatmospheric pressure or with considerable diluent in the hydrogen; however, as illustrtated in the foregoing examples, it is necessary for hydrogen to be present in the reaction zone in order for the catalyst to have activity.

The process of the present invention may be effected in any suitable apparatus. Since at the temperature of the reactions the catalyst mixture may be in the liquid state or as a slurry, the process may be effected by passing a hydrocarbon and the boron chloride into a bed of finely divided aluminum. The hydrogen-containing gas may be introduced through high velocity jets which will create turbulence in the reaction zone. However, it is preferred to mix the hydrogen with the charge stock prior to introduction into the reaction zone in order to gain the advantage of the solubility of hydrogen in hydrocarbon thereby causing intimate association of the two reactants. The process of the present invention may also be effected in suspensoid or fluidized operations wherein the catalytic material and the material to be converted flow concurrently through a reaction zone and are subsequently separated into a catalyst stream and a product stream.

The apparatus for effecting this process may contain means for removing solid carbonaceous material from the product. Such means may include floating coke from the surface of the liquid product, passing all or a portion of the product through a filtering means, burning the small amount of coke that is formed to prevent an accumulation and preferably effecting the burning in a zone remote from the reaction zone, and other means. The process will generally include recycling of at least a portion of the process gas as well as recycling at least a portion of the uncracked material from the product stream.

The proportion of boron chloride to aluminum metal in the catalyst mixture is not critical. In a commercial operation it may be necessary to continuously add both aluminum metal and boron chloride to the reaction zone to make up for the material lost in the product stream. A means of continuously recovering any small amounts of halides dissolved in the hydrocarbon product may be employed so that these losses are diminished. Such means may include fractionation, cooling to reduce solubility, or extraction with suitable solvents. The activity of the catalyst mixture may be regulated to some extent by varying the proportion of boron chloride to aluminum present. Generally the activity will be diminished when the amount of aluminum is reduced, however, when excessive proportions of aluminum and a limited quantity of boron chloride is present, the activity is also reduced.

Impure aluminum or aluminum alloys may be used as part of the catalyst mixture of this invention although not necessarily with equivalent results. One such alloy is an aluminum-copper-zinc alloy known as Devarda's alloy.

Small amounts of other material may be present in the reaction zone to promote the catalytic activity or to cause variations of that activity. Especially if an alkaline impurity is present in the charging stock it is desirable for small amounts of hydrogen chloride or other hydrogen halides to be present as an extraneous material and it is thought but not definitely known that the improved efficiency of the catalyst in these cases is due to simple neutralization of the undesirable alkaline material. It is also contemplated that hydrogenation promoting materials such as metals on the left hand column of groups V, VI and VII and metals contained in group VIII which may be in an extended surface condition as when composited with high surface area, adsorbent inorganic oxide gels or plural gels such as silica, alumina, magnesia and mixtures thereof. It is also contemplated that the hydrogenation promoting materials may be in the form of metals, oxides, sulfides or other compounds or mixtures thereof.

Equivalent results have been obtained in experiments wherein organic compounds of boron chloride are used instead of boron chloride. Therefore boron chloride etherates which probably decompose in the reaction zone to form boron chloride give similar results to a catalyst using boron chloride per se.

I claim as my invention:

1. A process for hydrocracking a hydrocarbon fraction heavier than gasoline to produce a substantial amount of gasoline therefrom which comprises contacting said hydrocarbon fraction at a temperature of from about 650° F. to about 1200° F. and a pressure of from about 100 p.s.i. in the presence of hydrogen with a catalyst comprising boron chloride and aluminum metal.

2. A process for hydrocracking a residuum fraction heavier than gasoline to produce a substantial amount of gasoline therefrom which comprises contacting said fraction at a temperature of from about 650° F. to about 1200° F. and at a pressure of from about 100 p.s.i. to about 10,000 p.s.i. of hydrogen with a catalyst comprising boron chloride and aluminum.

References Cited in the file of this patent

UNITED STATES PATENTS

| | | |
|---|---|---|
| 1,791,562 | Hofmann et al. | Feb. 10, 1931 |
| 1,854,146 | Galle et al. | Apr. 12, 1932 |
| 2,038,599 | Pier et al. | Apr. 28, 1936 |
| 2,426,273 | Johnstone | Aug. 26, 1947 |
| 2,506,720 | Jones | May 9, 1950 |

OTHER REFERENCES

"Anhydrous Aluminum Chloride in Organic Chemistry," C. A. Thomas, page 878, Reinhold Pub. Co., New York, 1941.